April 2, 1940.　　　　A. S. PABIAN　　　　2,195,995
DUMPING VEHICLE
Filed Feb. 27, 1939

Inventor:
Andrew S. Pabian,
by Franklin E. Low
Att'y.

Patented Apr. 2, 1940

2,195,995

UNITED STATES PATENT OFFICE 2,195,995

DUMPING VEHICLE

Andrew S. Pabian, Somerville, Mass.

Application February 27, 1939, Serial No. 258,690

3 Claims. (Cl. 298—12)

This invention relates to a dumping vehicle and has for its object to provide a vehicle, as for example a motor or horse drawn truck, with a simple, inexpensive, easily operated body member which may be tipped to dump its load without any effort upon the part of the operator of the vehicle, or without utilizing any mechanism actuated by the vehicle driving mechanism.

The invention consists of a dumping vehicle as set forth in the following specification and particularly as pointed out in the claims.

Referring to the drawing.

Like numerals refer to like parts throughout the several views of the drawing.

Figure 1:
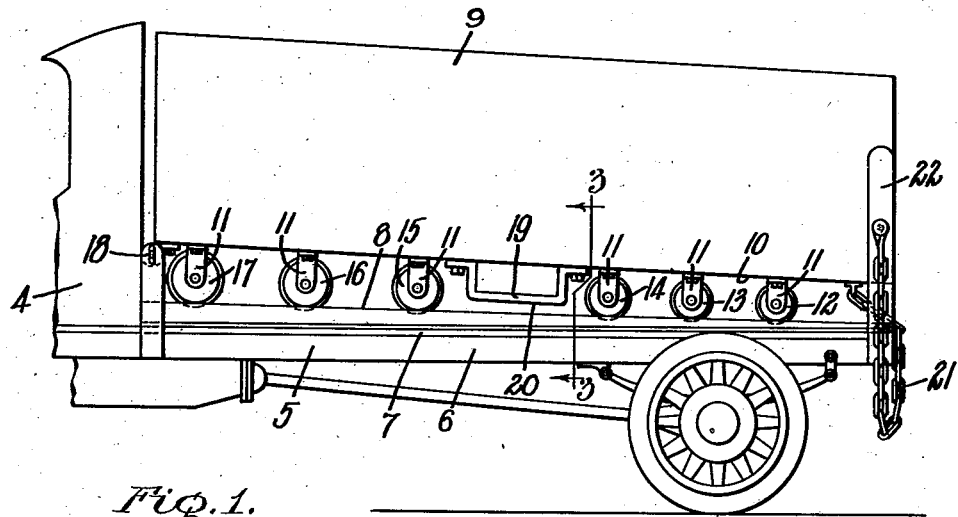
Fig. 1 represents a side elevation of a rear portion of a vehicle chassis including a dumping body member embodying my invention.
Figure 3:
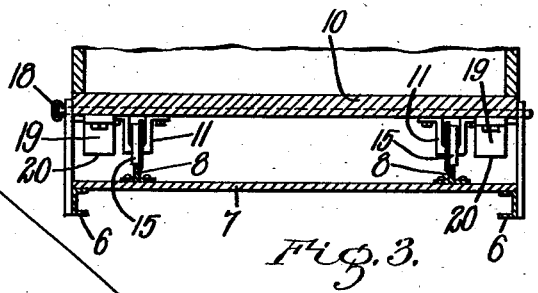
Fig. 3 is a detail transverse section taken on the line 3—3 of Fig. 1.

In the drawing, 5 represents the chassis of a truck of conventional type provided with side frame members 6 and a floor 7 or other suitable supporting structure for a pair of parallel tracks 8 which extend from the rear of a cab 4 for said truck to the rear end of the floor 7. The tracks 8 are inclined, sloping downwardly slightly from their front ends toward their rear ends. The chassis 5 is provided with a body member 9 of any suitable construction, to the under side of a floor 10 of which are secured a plurality of bearing members 11 upon which flanged wheels 12, 13, 14, 15, 16 and 17 are rotatably mounted. A set of the wheels 12 to 17 inclusive are provided for each side of the body member 9 to rest upon each track 8, and said wheels increase in diameter slightly from the rearmost wheels 12 toward the foremost wheels 17 in a manner to increase the inclination of the body member 9 upon the inclined tracks 8. The body member 9 is locked in its forward position and also prevented from lifting off the tracks 8 at its forward end by a locking bar 18.

Figure 2:
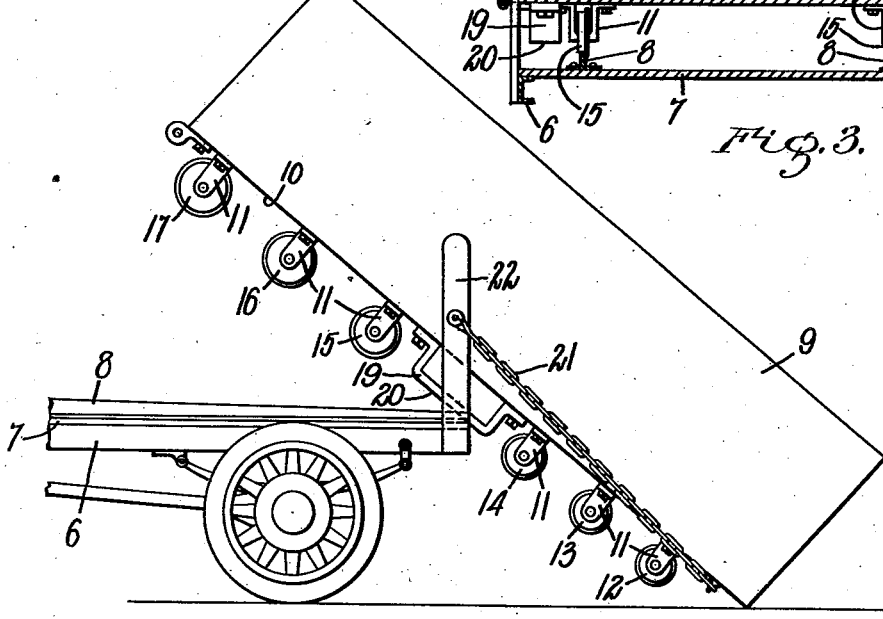
Fig. 2 is a side elevation of the rear portion of the vehicle chassis illustrating the body member in a tipped position.

Secured to the under side of the floor 10 adjacent to opposite sides thereof and at points midway between the front and rear ends of the body member 9 are pivot members 19 having a flat surface 20 embodied therein which contacts with the floor 7 of the chassis at the rear end thereof during the dumping operation after the wheels 12, 13 and 14 have become disengaged from the tracks 8. The rearward movement of the body member 9 during the dumping operation is restricted as may be desired by chains 21 provided at opposite sides of said body member and secured at their forward ends to posts 22 provided upon the chassis. It will be understood that the effective length of the chains 22 may be varied and that an increase or decrease in the length of said chains will change the tipping position of the body member. During the dumping operation the flat surfaces 20 of the pivot members 19 engage the rear end of the floor 7 of the chassis as illustrated in Fig. 2 and a restricted sliding contact is permitted between the pivot members and said floor.

It will be evident that the dumping action of the body member will be influenced considerably by the weight distribution of the load within said body member. After the load has been dumped the body member 9 must necessarily be lifted by the operator, but the weight distribution of the empty body member is such that it is easily returned to the tracks and pushed upwardly to the position illustrated in Fig. 1.

I claim:

1. The combination with a vehicle chassis of tracks mounted thereon and sloping downwardly toward the rear thereof, a body member, a plurality of wheels attached to said body member and arranged to support the latter upon said tracks, and pivot members secured at an intermediate position beneath said body member upon opposite sides thereof arranged to pivotally contact with the rear extremity of said chassis and also slide thereupon during the tipping movement of said body member upon the chassis.

2. The combination with a vehicle chassis of tracks mounted thereon and sloping downwardly toward the rear thereof, a body member, a plurality of wheels attached to said body member and arranged to support the latter upon said tracks, said wheels increasing in diameter from the rearmost wheels toward the foremost wheels, and pivot members secured at an intermediate position beneath said body member upon opposite sides thereof arranged to pivotally contact with the rear extremity of said chassis and also to slide thereupon during the tipping movement of said body member upon the chassis.

3. The combination with a vehicle chassis of tracks mounted thereon and sloping downwardly toward the rear thereof, a body member, a plurality of wheels attached to said body member and arranged to support the latter upon said tracks, said wheels increasing in diameter from the rearmost wheels toward the foremost wheels, and pivot members secured at an intermediate position beneath said body member upon opposite sides thereof and provided with flat surfaces arranged to pivotally contact with the rear extremity of said chassis and also slide thereupon during the tipping movement of said body member upon the chassis.

ANDREW S. PABIAN.